United States Patent [19]

Burgess

[11] 3,925,191
[45] Dec. 9, 1975

[54] HYDROCARBON CONVERSION OVER ACTIVATED ERIONITE

[75] Inventor: William P. Burgess, Hopewell, N.J.

[73] Assignee: Mobil Oil Corporation, New York, N.Y.

[22] Filed: July 17, 1974

[21] Appl. No.: 489,952

[52] U.S. Cl. .......... 208/111; 208/DIG. 2; 208/66; 208/120; 208/135; 252/455 Z; 423/329
[51] Int. Cl.² .............. C10G 13/04; C10G 37/06; B01J 29/28
[58] Field of Search .................... 208/111, 120

[56] References Cited
UNITED STATES PATENTS

| | | | |
|---|---|---|---|
| 2,950,952 | 8/1960 | Breck et al. | 423/329 |
| 3,287,252 | 11/1966 | Young | 208/59 |
| 3,379,640 | 4/1968 | Chen et al. | 208/111 |
| 3,474,025 | 10/1969 | Garwood | 208/111 |
| 3,535,225 | 10/1970 | Jaffe | 208/59 |
| 3,575,846 | 4/1971 | Hamner et al. | 208/111 |
| 3,591,488 | 7/1971 | Eberly et al. | 208/111 |
| 3,598,719 | 8/1971 | White | 208/59 |
| 3,644,200 | 2/1972 | Young | 208/120 |
| 3,783,123 | 1/1974 | Young | 208/111 |
| 3,783,124 | 1/1974 | Rubin et al. | 208/111 |

Primary Examiner—Delbert E. Gantz
Assistant Examiner—G. E. Schmitkons
Attorney, Agent, or Firm—Charles A. Huggett; Raymond W. Barclay; Claude E. Setliff

[57] ABSTRACT

This invention is directed to the shape selective conversion of a hydrocarbon charge over H-erionite, both natural and synthetic, which has been activated by exchanging with the ammonium ion as a first step, calcining in steam and exchanging with the ammonium ion. The conversion is conducted in the presence of a hydrogen atmosphere but in the absence of any hydrogenating catalyst such as a metal of the platinum group.

8 Claims, 2 Drawing Figures

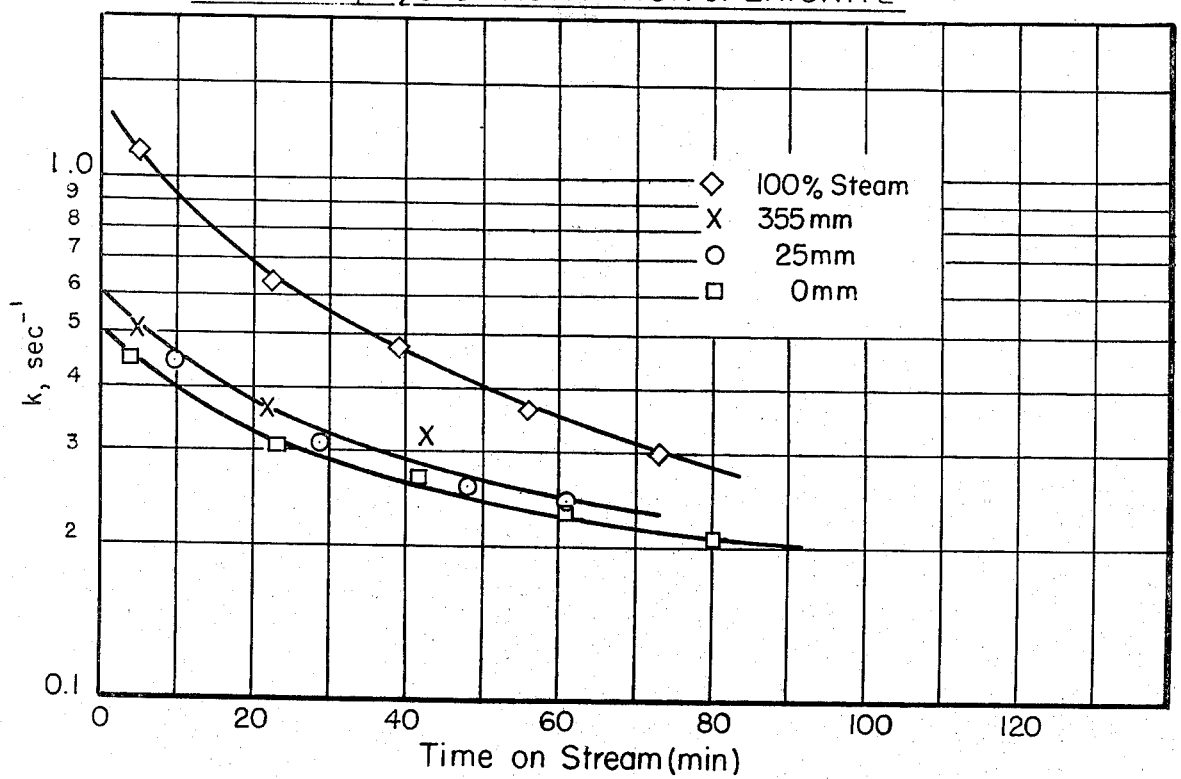
FIGURE 1. EFFECT of pH₂O on ACTIVATION of ERIONITE
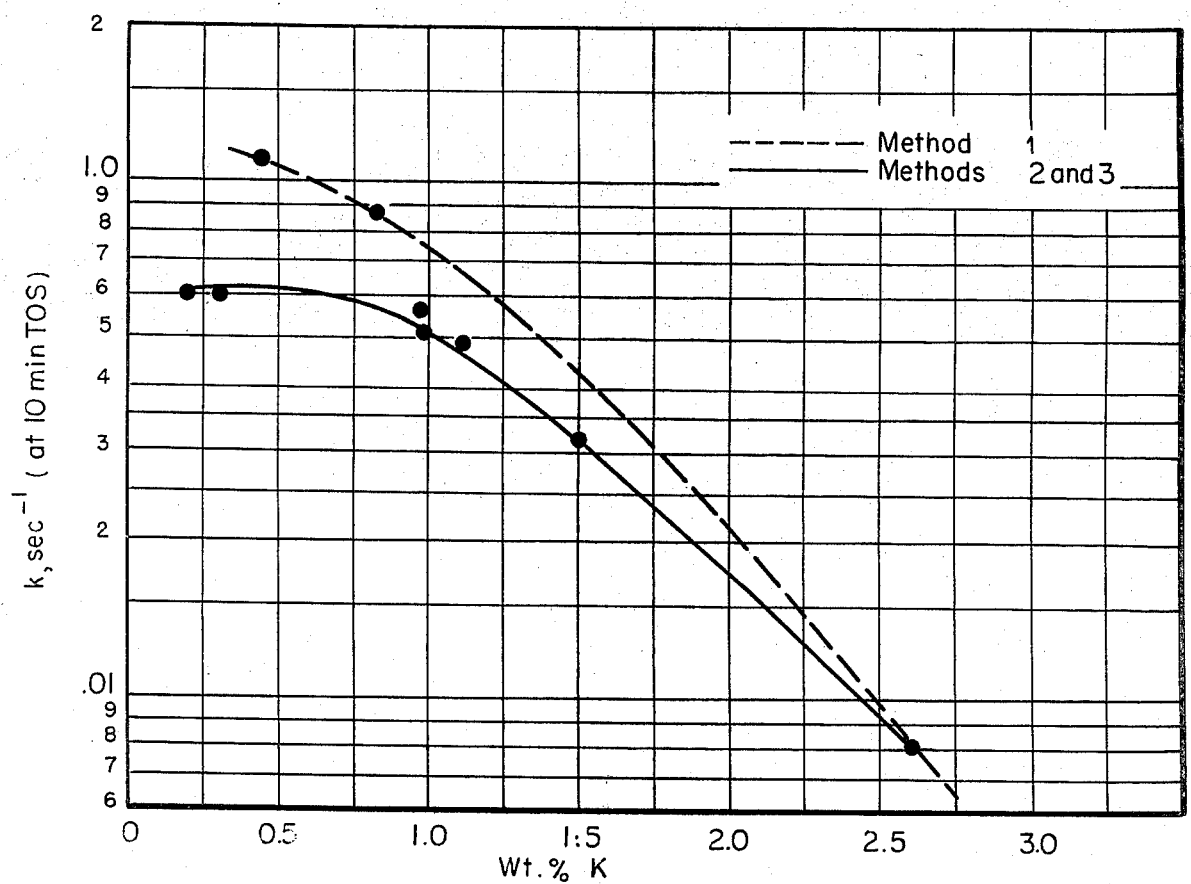
FIGURE 2.

HYDROCARBON CONVERSION OVER ACTIVATED ERIONITE

BACKGROUND OF THE INVENTION

1. Field of the Invention

The invention is concerned with hydrocarbon conversion processes. More particularly it is concerned with the shape selective conversion of a hydrocarbon charge by contacting same with specially treated H-erionite in the presence of hydrogen but in the absence of a hydrogenation catalyst.

2. Discussion of the Prior Art

It is well known in the prior art to crack a hydrocarbon charge by contacting it with a zeolite to which a hydrogenation catalyst has been added, either by impregnation or by ion exchange. For example, U.S. Pat. No. 3,379,640 relates generally to a shape selective hydrocarbon conversion process in which the zeolite must meet three critical criteria. These are that, first, it must have a certain silicon to aluminum ratio, second, there must be no hydrogenation/dehydrogenation metals, etc. on the surface of the crystal and third, any hydrogenation/dehydrogenation component present therein must be within the interior of the crystal and be present to no greater extent than about 1.5 cations in a supercage of metals having hydrogenation/dehydrogenation activity.

U.S. Pat. No. 3,575,846 is concerned with a selective hydrocracking process accomplished in the presence of an erionite catalyst having a low potassium content and combined with a metallic hydrogenation component.

U.S. Pat. No. 3,474,025 discloses the use of a zeolite in shape selective hydrocarbon conversions, the zeolite containing no hydrogenating catalyst. The patent discloses the zeolite to be offretite, but it is now known that the zeolite described in such patent is actually erionite. In any event, the present invention is distinguishable over U.S. Pat. No. 3,474,025 in at least two respects. First, the zeolite of the above patent must have inserted therein a certain amount of rare earth cations and second, the activation procedure, as exemplified in Experiment 3, column 2, lacks the preheating and the second $NH_4^+$ exchange, which contributes to the catalysts of the present invention having such high activities.

SUMMARY OF THE INVENTION

In accordance with the present invention there is provided a method for the shape selective conversion of a straight chain hydrocarbon in hydrocarbon mixtures containing same by contacting the hydrocarbon with a crystalline aluminosilicate erionite which has been activated by a procedure comprising the steps of exchanging with the ammonium cation, heating in steam at from about 700°F to about 1400°F and exchanging again with the ammonium cation. The conversion is carried out at from about 500°F to about 1000°F, in the presence of hydrogen, but in the absence of hydrogenation-dehydrogenation catalytic metal components.

DESCRIPTION OF SPECIFIC EMBODIMENTS

Erionite per se is a naturally occurring zeolite having elliptical pore openings of about 4.7 to 5.2 angstroms on its major axis. Synthetic erionite, called "Zeolite T" in the art, is described in U.S. Pat. No. 2,950,952. It is characterized in such patent as having the following mole ratios of oxides:

$$1.1 \pm 0.4 \; [xNa_2O:(1-x)K_2O]:Al_2O_3:6.9 \pm 0.5 \; SiO_2 \cdot yH_2O$$

where $x$ is from about 0.1 to about 0.8 and $y$ is about 0 to about 8.

The ability of erionite to selectively catalyze the conversion of straight-chain hydrocarbons in a hydrocarbon charge is surprisingly improved by following the treatment procedure described herein. Conventional means for exchanging the Na and/or K cations in erionite include an exchange (which generally involves a series of exchanges) with a cation, such as the $NH_4^+$ cation, followed by a heating step to activate the zeolite. As is evident from U.S. Pat. No. 3,474,025, column 2 (Experiment 3), such procedure produces H-erionite with low K and Na contents, but with very low activity.

In carrying out the process of this invention, the zeolite is first exchanged with a salt solution of the $NH_4^+$ cation, the concentration of the salt not being critical. Any of the soluble salts of the $NH_4^+$ cation may be used. These include the inorganic sulfate or nitrate salts as well as the organic acetate or formate salts. The exchange is carried out by mixing an excess of the salt solution with the zeolites and maintaining contact therewith for from about 10 minutes to about 30 hours.

The rate of exchange can be increased by carrying it out at an elevated temperature. Obviously, the exchange temperature of the solution must be below the atmosphere boiling point of the solution. It may of course be higher than one atmosphere and may range from about one atmosphere to about 3000 psig, when pressure equipment is used. Suitable exchange may be carried out at temperatures of from about 75°F to about 680°F. The excess salts are removed usually by washing.

Following this exchange procedure the exchanged erionite is heated in 90–100% steam at from about 700°F to about 1400°F, preferably about 950°F to about 1250°F. The temperature must not be so high, though, that it will cause the zeolite crystalline structure to collapse. The treatment time will depend upon the temperature employed with suitable results being obtained at a temperature of 1000°F to 1200°F for periods of from about 1½ to 2 hours.

In the next step the exchanged and steamed zeolite is again exchanged with ammonium cations as before. After washing and drying, the finally exchanged erionite is activated by calcining at from about 750°F to about 1000°F for from about 2 to about 20 hours.

The following examples will illustrate the invention.

Example 1

This example illustrates the effects on precalcination of varying amounts of water in the heating atmosphere. Erionite ore (C, 3, 4, 5 ore) was exchanged twice for 16 hours and 4 hours, respectively, with 5M $NH_4Cl$ at reflux temperature. The residual potassium content was 2.6%. Portions of the sample were calcined with various air/water mixtures at 1 atm. for 1½ hours at 1000°F, at 0, 25, 355 and 760 mm partial pressure of water in the air. Each sample was then exchanged with 4M $(NH_4)_2SO_4$ once for 16 hours.

These catalysts were calcined for 2 hours in dry air at 1000°F and analyzed. They were then tested in the hexane conversion test, or the so-called shape selective alpha test, using the continuous mode, with a 3-component feed (normal hexane, 3-methylpentane and 2,3-dimethylbutane) at 750°F. In general, the feed is charged over the catalyst and the product is analyzed at regular intervals.

The effect on activity of the water partial pressure in the precalcination step is shown in FIG. 1 in which the n-hexane first order cracking rate constant (k, sec$^{-1}$) vs. time on steam (TOS) is plotted. The plot shows very little differences in activity due to the effect of various water concentrations in the precalcination air at less than 355 mm Hg of water. It is significant, however, that at 1 atm. of water (i.e. 100% water) the treated zeolite has significantly higher activity - on the order of twice that of catalysts prepared using less water in the calcining atmosphere.

EXAMPLE 2

This example compares the activity of steamed erionite with erionite that has been calcined in air or exchanged in an autoclave. In preparing the samples, the following was done.

1. Ammonium erionite samples were steamed at 1000°F for 1.5 hours and 1 atm. of water, and were then exchanged again with the ammonium ion, washed and heated at 1000°F for 2 hours.

2. Same as 1. except calcining was in dry air.

3. Ammonium erionite samples were placed in an autoclave with 4M $(NH_4)_2SO_4$ and maintained for 16 hours at various temperatures and pressures. After autoclaving, samples were water washed and heated at 1000°F for 2 hours.

The erionite was the erionite ore of Example 1 and the exchanges were substantially as described in that example.

The potassium contents of the various samples are shown in Table 1.

TABLE 1

| Method No. | Temp. | Psig | Wt. % K |
| --- | --- | --- | --- |
| Blank (ore) | — | — | 2.6 |
| 1 | — | — | 0.44 |
|  | — | — | 0.83 |
| 2 | — | — | 0.97 |
|  | — | — | 0.98 |
|  | — | — | 0.10 |
| 3 | 650°F | 2200 | 0.20 |
|  | 600°F | 1550 | 0.31 |
|  | 400°F | 250 | 1.50 |

The acid cracking activity of these samples was measured in the alpha test. The 10-minute activity (first order cracking rate constant for n-hexane cracking after 10 minutes on stream) is plotted as a function of K level in the samples in FIG. 2. Samples prepared by method 1 form one curve; those prepared by methods 2 and 3 form the other. It may be seen that steaming produced a more active catalyst.

EXAMPLE 3

This example shows the stability of steamed ammonium erionite in the conversion of a $C_6$-260°F reformate having the following properties.

| Octane No. | 76.0 (R+O) |
| --- | --- |
| Density | 0.7365 g/cc |
| Paraffins, wt. % | 59.3 |
| Naphthenes | 3.1 |
| Aromatics | 37.6 |

-continued

| Wt. % normal paraffins | |
| --- | --- |
| $C_6$ | 9.07 |
| $C_7$ | 5.72 |
| $C_8$ | 1.48 |

C3.4.5 erionite ore was exchanged with refluxing 5N $NH_4Cl$(13 ml/grams of zeolite) for 16 hours, was washed, reexchanged (under the same conditions) for 4 hours and washed free of excess $Cl^-$ ion. The ammonium form of the ore was then steamed at 1000°F and 1 atmosphere of $H_2O$ for 1 hour. The steamed zeolite was then exchanged with excess refluxing 8N $(NH_4)_2SO_4$ for 16 hours and was finally washed until all excess $NH_4^+$ and $SO_4^=$ ions were removed.

The catalyst was tested for its activity in converting n-$C_6$ and n-$C_7$ hydrocarbons out of a reformate (defined hereinabove). The test was run at 250 psig, 3 LHSV (3.9 WHSV) and at a 5/1 hydrogen/hydrocarbon ratio. The catalyst contained no nickel or other hydrogenation/dehydrogenation component.

Table 2 summarizes the data obtained at three different temperatures. The last point on the graph (at 78 days) was obtained following regeneration at 900°F.

Comparable results with air-calcined ammonium erionite shows that the activity of such catalyst levels off at a point below those obtained with commercial catalysts containing erionite and a hydrogenation-dehydrogenation component.

TABLE 2

| Temperature °F | Time on Stream, days | Wt.% Conv. of n-$C_6$ and n-$C_7$ |
| --- | --- | --- |
| 897 | 5 | 85 |
|  | 10 | 75.5 |
|  | 13 | 71 |
|  | 16 | 71 |
|  | 19 | 67 |
|  | 25 | 45 |
|  | 38 | 44 |
| 909 | 41 | 45.5 |
|  | 42 | 45.5 |
|  | 45 | 45 |
|  | 48 | 48 |
|  | 52 | 46 |
|  | 56 | 43.5 |
| 932 | 63 | 50 |
|  | 66 | 50 |
|  | 69 | 50 |
|  | 75 | 46 |
| 896* | 78 | 46.5 |

*After regeneration at 900°F

EXAMPLE 4 a. A sample of Zeolite T (synthetic erionite) was given two 16 hour exchanges with 4 molar $(NH_4)_2SO_4$. This was washed and dried.

b. (a) was steamed (100% $H_2O$) at 1000°F for 1½ hours then exchanged once with $(NH_4)_2SO_4$ under the conditions described above.

c. (b) was steamed (100% $H_2O$) at 1000°F for 1½ hours then exchanged once with $(NH_4)_2SO_4$ as above. All exchanges in this and the above examples were at reflux.

Catalysts (a), (b) and (c) were used in the conversion of a $C_6$-290°F reformate (as defined in Example 3). The results are reported in Table 3.

TABLE 3

| Catalyst | Example 4(a) | | | | | Example 4(b) | | | | | Example 4(c) | | | |
| --- | --- | --- | --- | --- | --- | --- | --- | --- | --- | --- | --- | --- | --- | --- |
| LHSV (hr$^{-1}$) | 8.8 | 9.0 | 9.0 | 9.2 | 9.1 | 8.8 | 9.0 | 9.0 | 9.0 | 9.0 | 9.1 | 9.1 | 9.0 | 9.1 |
| Pressure (psig) | | 250 | | | | | 250 | | | | | 250 | | |
| H$_2$/HC (mole/mole) | | 5.3 | | | | | 5.2 | | | | | 5.3 | | |
| Time on Stream (hrs.) | 6 | 24 | 48 | 54 | 78 | 6 | 24 | 52 | 75 | 6 | 24 | 48 | 54 | 77 |
| Temperature (°F) | 850° | 850° | 850° | 900° | 850° | 850° | 850° | 900° | 850° | 850° | 850° | 850° | 900° | 850° |
| Wt.% Hydrocarbon Product | | | | | | | | | | | | | | |
| C$_1$ | 0.2 | 0.2 | 0.2 | 0.6 | 0.2 | 0.3 | 0.4 | 1.3 | 0.8 | 0.3 | 0.4 | 0.5 | 1.3 | 0.6 |
| C$_2$ | 0.3 | 0.4 | 0.4 | 1.1 | 0.4 | 0.6 | 0.8 | 2.1 | 1.2 | 0.6 | 0.8 | 1.0 | 2.1 | 1.0 |
| C$_3$ | 4.3 | 4.0 | 4.7 | 8.2 | 5.0 | 2.4 | 9.7 | 12.6 | 14.5 | 6.7 | 9.9 | 9.8 | 12.4 | 11.2 |
| i—C$_4$ | 0.5 | 0.2 | 0.2 | 0.4 | 0.3 | 0.5 | 0.4 | 0.2 | 0.3 | 0.4 | 0.3 | 0.2 | 0.2 | 0.3 |
| n—C$_4$ | 1.0 | 0.9 | 0.9 | 1.5 | 1.0 | 1.4 | 1.4 | 1.3 | 0.8 | 1.3 | 1.6 | 1.4 | 1.3 | 1.5 |
| C$_5$+ | 93.8 | 94.4 | 93.6 | 88.3 | 93.1 | 88.8 | 87.4 | 82.6 | 82.4 | 90.9 | 87.0 | 87.1 | 82.8 | 85.4 |
| % Conversions | | | | | | | | | | | | | | |
| n—C$_6$ | 40 | 41 | 46 | 71 | 47 | 67 | 77 | 98 | 81 | 62 | 73 | 84 | 98 | 92 |
| n—C$_7$ | 36 | 37 | 42 | 72 | 44 | 64 | 76 | 99 | 93 | 58 | 71 | 84 | 99 | 92 |
| n—C$_8$ | 25 | 25 | 27 | 61 | 29 | 47 | 60 | 97 | 88 | 52 | — | — | 97 | 87 |
| C$_5$+ Octane, Calculated R+O$^{(5)}$ | 82.0 | 82.0 | 82.6 | 84.7 | 82.6 | 85.3 | 86.2 | 90.4 | 89.0 | 86.4 | 87.5 | 85.9 | 89.8 | 88.2 |

The importance of the invention described herein can be appreciated when it is realized that heretofore, when a crystalline aluminosilicate was used in a selective cracking or hydrocracking operation, it was necessary to have associated therewith a hydrogenation-dehydrogenation component, either as an elemental metal or in the form of a metallic cation. This is apparent from two of the three patents discussed hereinabove in the section on prior art.

The feed stocks utilized in the present invention will generally include mixtures of hydrocarbons and particularly petroleum distillates falling within the approximate range of about 80° to about 750°F., which range will include naphthas, gaoslines, kerosenes, gas oils, middle distillates, and the like. Preferably, the feed will be predominantly naptha-containing and may consist of either low boiling or high boiling naphthas. Typical low boiling feeds will have boiling ranges of about 50° to 250°F., preferably 75° to 180°F., whereas typical heavy naphtha feeds will boil within the range of about 350° to 450°F., preferably 375° to 430°F. Examples of such feed stocks, both low boiling and high boiling, are virgin naphtha fractions such as C$_5$-C$_6$ naphtha, heavy virgin naphtha, heavy coker naphtha, heavy steam cracked naphtha, heavy catalytic naphtha, etc. Particularly preferred feed stocks will include the light naphthas as described above, naphthas suitable as hydroformer feeds and naphtha products from the hydroforming operation, which feeds will typically boil in the range of about 50° to 400°F., preferably 80° to 350°F. A prime hydroformer feed will have about a 180° to 360°F. boiling range. A requirement for the feed stocks used in the present invention is that they contain a substantial quantity of straight chain hydrocarbons which are converted or removed in accordance with the present invention.

The above feed stocks are treated with the aforedescribed erionite catalysts in either fixed bed, moving bed, or fluidized solids operation, either upflow or downflow (in bed reactors), at the following operating conditions:

| | Generally preferred | Particularly preferred |
| --- | --- | --- |
| Temperature, °F | 650–1000 | 700–850 |
| Pressure, p.s.i.g. | 100–2000 | 200–1000 |
| Space velocity, v/v/hr | 0.25–5$^{(1)}$ | 0.5–2$^{(1)}$ |
| | 0.5–40$^{(2)}$ | 4–20$^{(2)}$ |
| Hydrogen rate, scf/b | 500–10,000 | 1000–4000 |

$^{(1)}$Naphthas of 50–200°F boiling range
$^{(2)}$Naphthas in 180–430°F boiling range usable in hydroforming operations.

The essence of the present invention, namely the use of the aforedescribed catalysts for the selective removal of straight chain hydrocarbons can be utilized in various processing schemes depending upon the results desired. These various processing schemes will now be described in some detail as they represent specific embodiments of the present invention.

The catalysts of the invention can conveniently be used to upgrade naphtha fractions for inclusion in the high quality motor gasoline pools. This may involve a single stage operation wherein the naphtha feed is introduced into contact with the erionite catalyst at the aforedescribed conditions, and the resulting product has a greatly enhanced octane number.

The erionite catalyst of the invention can be utilized to upgrade previously hydrocracked feed stocks, e.g. an additional hydrocracking stage containing the erionite catalyst can be used in conjunction with a conventional hydrocracking operation in order to produce higher octane product. The conventional hydrocracking stages are conducted with any of the various available hydrocracking catalysts and most preferably with the newly developed relatively large pore (e.g. 6 to 15 angstrom units) crystalline aluminosilicate zeolite catalysts containing metallic hydrogenation components. Such catalysts have been extensively described in the recent prior art, e.g. U.S. Pat. Nos. 2,971,904 and 3,287,252. In this embodiment the total hydrocracked product from the relatively large pore size zeolite catalysts, or a selected portion thereof, may be contacted with the selective erionite catalyst of the invention. Intermediate fractionation and segregation of desired fractions can be used. Typical hydrocracking conditions with the large pore zeolite catalysts will include temperatures from about 400° to 800°F., pressures of about 250 to 2500 psig, liquid hourly space velocities of about 0.2 to 2 v/v/hr and hydrogen rates of about 1000 to 20,000 scf/b.

The erionite catalysts of the invention can be used in conjunction with conventional hydroforming operations. In this case the erionite catalysts can be used either in a lead reactor to pretreat the feed passing to the hydroforming reactors, or can be utilized either in a separate tail reactor or in a bottom portion of the last hydroformer of the train, to selectively convert remaining straight chain hydrocarbons so as to further increase the octane number of the hydroformed product. The erionite catalyst can also be utilized in admixture with conventional hydroforming catalysts in one or more conventional hydroforming reactors.

I claim:

1. An improved process for the shape selective conversion of straight-chain hydrocarbons from a hydrocarbon feed which comprises the selective conversion of said feed by contact, at elevated temperature and pressure and in the presence of hydrogen, with a catalyst comprising a crystalline aluminosilicate erionite, the erionite having no hydrogenation-dehydrogenation metal associated therewith and having been prepared by the steps of comprising (a) exchange with the ammonium cation, (b) exposing it to 100% steam at elevated temperatures and (c) reexchanging with the ammonium cation.

2. The process of claim 1 wherein the zeolite following the first exchange is exposed to temperatures of from about 700°F to about 1400°F.

3. The process of claim 1 wherein the zeolite following the exchange of step (c) is heated at from about 750°F to about 1100°F.

4. The method of claim 1 wherein said erionite is natural erionite.

5. The method of claim 1 wherein said erionite is synthetic erionite.

6. The method of claim 1 wherein the exchanges are carried out at for from about 10 minutes to about 20 hours.

7. The method of claim 6 wherein the exchanges are carried out at a pressure of from 1 atmosphere to 3000 psig.

8. The method of claim 6 wherein the exchanges are carried out at from about 75°F to about 680°F.

* * * * *

UNITED STATES PATENT AND TRADEMARK OFFICE
CERTIFICATE OF CORRECTION

PATENT NO. : 3,925,191
DATED : December 9, 1975
INVENTOR(S) : WILLIAM P. BURGESS It is certified that error appears in the above-identified patent and that said Letters Patent are hereby corrected as shown below:

Column 2, line 1, Formula "$SiO_2-yH_2O$" should read
--$SiO_2 : yH_2O$--.

Columns 5 & 6, Table 3, "$R+O^{(5)}$", appearing below Table 3 in Column 5 should appear after "Calculated" in the table, i.e. --Calculated $R+O^{(5)}$--.

Column 7, line 20, Delete the word "of" before the word "comprising".

Signed and Sealed this

Twentieth Day of July 1976

[SEAL]

Attest:

RUTH C. MASON
*Attesting Officer*

C. MARSHALL DANN
*Commissioner of Patents and Trademarks*